US00H002103H

(19) United States

(12) Statutory Invention Registration (10) Reg. No.: US H2103 H

Modiano (43) Published: May 4, 2004

(54) PACKET SCHEDULING BASED ON MESSAGE LENGTH

(75) Inventor: Eytan Modiano, Cambridge, MA (US)

(73) Assignee: The United States of America as represented by the Secretary of the Air Force, Washington, DC (US)

(21) Appl. No.: 09/389,744

(22) Filed: Sep. 7, 1999

(51) Int. Cl.[7] ..... G08C 15/00

(52) U.S. Cl. ..... 370/230

(58) Field of Search ..... 370/230, 230.1, 370/355, 394, 392, 395.1, 395.4, 395.41, 395.42, 473, 474

(56) References Cited

PUBLICATIONS (Scheduling packet transmissions in a multi–hop packet switched network based on message length) Modiano, E. Computer Communications and Networks, 1997. Proceedings, Sixth International Conference on, 1997 pp.: 350–357.*

* cited by examiner

*Primary Examiner*—Daniel T. Pihulic

(74) *Attorney, Agent, or Firm*—William G. Auton

(57) ABSTRACT

A system using two algorithms for scheduling packets in a multi-hop network. The objective of the algorithms is to reduce end-to-end message (not packet) transmission delays. Both algorithms schedule packet transmissions based on the length of the original message to which the package belongs. The first algorithm is preemptive and is based on the shortest-message-first principle and the second is based on the shortest-remaining-transmit-time principle. We develop simulation models for analyzing the algorithms. The simulations show that when message sizes vary widely, these algorithms can significantly reduce average end-to-end message delays compared to the First-Come-First-Serve scheduling.

12 Claims, 17 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

A SINGLE NODE SYSTEM

ALL LINKS OF RATE 1 CELL PER SECOND

SRTT MESSAGE DELAY FOR SINGLE CELL MESSAGES

PACKET SCHEDULING BASED ON MESSAGE LENGTH

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to multi-hop networks and more specifically the invention pertains to a system for packet scheduling based on message length.

Network protocols, such as IP or ATM, transport data in packets. The algorithms used by these protocols, for routing, scheduling, flow and access control, are usually designed to satisfy performance measures at the packet level (e.g., average packet delay). However, user applications, such as file transfer (FTP), exchange data messages which are not limited in size to that of a network protocol packet. This separation between the application data and the way in which networks manage that data often results in sub-optimal performance when measured in terms of application layer messages. This paper describes packet scheduling algorithms that attempt to reduce end-to-end message delays by taking into account message information in the scheduling of packets across the network.

Network layer packets are typically limited in size to hundreds or thousands of bits. As a result, data messages are fragmented into multiple packets. These packets are then sent to the network layer protocol for delivery across the network. As the packets traverse the network they are queued at nodes along their way together with packets belonging to other messages. Typically, the network layer has no knowledge of the original message to which a packet belongs and serves them on a First-Come-First-Serve (FCFS) basis.

Serving packets on a FCFS basis may be a reasonable strategy if one is only concerned with packet delays. It is known that in a single node, average queuing delay is the same, regardless of scheduling policy, as long as scheduling is not done on the basis of the packet length. If packets are scheduled on the basis of their length, then it has been shown that a scheduling policy that serves the shortest packet first results in minimum delays. However, from an end user point of view, message delays rather than packet delays is a more important performance measure. These messages can be as short as a few hundreds of bits for a short e-mail, to Giga-bits for an image file. In this paper we are concerned with the end-to-end delays experienced by these higher layer messages.

SUMMARY OF THE INVENTION

The present invention is a system that uses two algorithms for scheduling packets in a multi-hop network. The objective of the algorithms is to reduce end-to-end message (not packet) transmission delays. Both algorithms schedule packet transmissions based on the length of the original message to which the packet belongs. The first algorithm is based on the shortest-message-first principle and the second is based on the shortest-remaining-transmit-time principle. Simulations show that these algorithms can significantly reduce average end-to-end message delays compared to First-Come-First-Serve scheduling.

DETAILED DESCRIPTION OF THE PREFERRED EMBODIMENT

The present invention is a system for scheduling packets in a network. This new mechanism schedules the packets based on the length of the original (application layer) message, with the objective of reducing end-to-end message delays.

Figure 1:
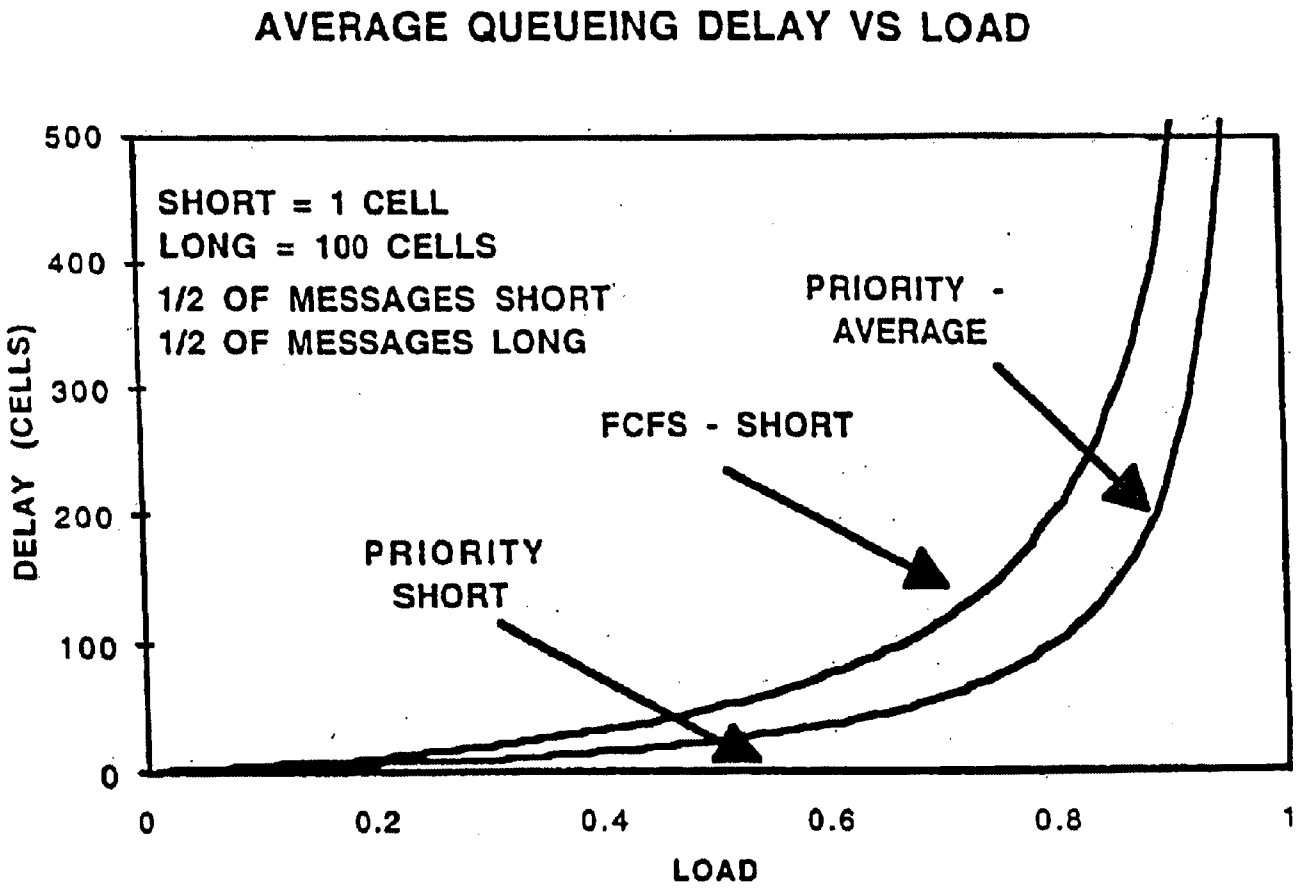
FIG. 1 is a chart of the average message delay in a single node system.

In considering the scheduling of messages at a single node, it is clear that when message sizes vary widely the scheduling of messages based on their size reduces average message delays considerably. As an example, in FIG. 1 we show the average queuing delay for a single node system with messages arriving randomly with exponential inter-arrival times. Half of the arriving messages are one cell in length and the other half are 100 cells in length. Shown in the figure is the queuing delay for two scheduling algorithms. One algorithm serves the messages preemptive priority over the long messages. As can be seen from the figure the average delay for the priority system is much lower than the corresponding delays for the FCFS system.

In general, it is known that for a single server non-preemptive system the scheduling algorithm that minimizes average message delays gives priority to shorter messages over longer ones. In a preemptive system the scheduling algorithm that minimizes average message delays gives preemptive priority to the message with the shortest remaining transmission time to completion.

While these scheduling algorithms were first studies in the context of processor sharing systems, they are particularly applicable to data networks. In data networks message lengths are known in advance and can be used to assign priority to packets. Further, since large messages are broken down into small packets, or cells, an approximate form of preemption can be implemented by allowing messages to preempt one another only after the transmission of the current packet. So, a short message priority algorithm can be implemented by giving packets belonging to shorter messages-priority cover those belonging to longer ones.

While this is not a pure form of preemptive priority scheduling, when packet sizes are much smaller than message sizes, it can achieve much of the benefit of a pure preemptive algorithm without incurring the added cost of preemption overhead.

In this idea of scheduling, messages based on the principle of giving preemptive priority to the message with the shortest remaining transmission-time was applied to an Ethernet LAN. There it was shown that using this principle can significantly reduce message transmission delays. An exact analysis was developed for single node network where messages are scheduled based on the shortest remaining transmission time principle. There, pure preemption was accomplished by fragmenting messages into packets whenever preemption was needed and adding a packetization overhead every time a message was preempted.

In this paper we study the implementation and performance of packet scheduling algorithms in a multi-hop network that are based on the above principles. Implementing these algorithms in a single node network is simple because the state of the system is always known (i.e., the length and remaining transmission times of all messages). However, in a multi-hop network, where messages arrive at intermediate nodes fragmented into packets so that the complete message information is not available, the design of scheduling algorithms based on message length information is not as straightforward.

In addition, the performance evaluation of these scheduling algorithms in a multi-hop network is complicated. In fact, even the computation of average message delays in a simple FCFS network is generally not analytically tractable: For FCFS scheduling some approximate models, such as Kleinrock's independence approximation are available. However, with the addition of a complicated service discipline obtaining accurate analytical results becomes completely hopeless. We, therefore, resort to simulation to evaluate the performance of the scheduling algorithms developed in this paper.

Below we describe the scheduling algorithms that we developed and how they may be implemented in a multi-hop packet switched network. Then we discuss simulation results of the algorithms in both a single node network and a simple multi-hop example network. Finally, we discuss our directions for future work and conclusions.

The scheduling algorithms we developed in this paper are based on the Shortest-Message-Preempt (SMP) and Shortest Remaining Transmission Time (SRTT) principles. All of the algorithms that we describe are preemptive in the sense that a stream of packets belonging to another message. Therefore, these algorithms are preemptive at the message level, but not at the packet level. That is, no packet is interrupted in the middle of its transmission.

These algorithms are designed to be implemented at every switch-in the network. However, their implementation is independent from switch to switch and requires no additional communication between the switches. Each switch implementing the algorithm is completely independent from other switches in the network. The algorithms do not rely on any information to be sent between the switches and, in fact, not all switches need to implement the algorithm.

The algorithms are based on the SRTT and SMP principles, but they are not a pure form of SRTT or SMP. This is due to the fact that pure SRTT or SMP would require every node in the network to have the full information about each message. That is, every node would need to know the exact message to which every packet belongs and the state of that message (i.e./ how much of it has already been transmitted). Since this information is not available at the network level, these algorithms approximate the behavior of SRTT and SMP by including some limited message information in the packet headers.

We discuss three algorithms. The first is simple First-Come-First-Serve (FCFS), which we use as the basis for comparison to the other two algorithms. The second algorithm is based on the Shortest-Message-Preempt (SMP) principle and the last is based on the Shortest-Remaining-Transmit-Time (SRTT) principle.

A. First-Come-First-Serve Packet Scheduling (FCFS-PS)

In FCFS-PS no effort is made to schedule the packets in a particular order. Packets are served based on the order in which they arrive at each node. Therefore, packets belonging to one message can be interrupted by those belonging to another message simply based on time of arrival. Essentially, FCFS-PS is the approach taken by packet switches where no attempt is made to schedule packets based on message information. We use the FCFS-PS algorithm as the basis for comparison of the other two algorithms.

It is very important to note that here FCFS-PS scheduling is not the same as FCFS message scheduling for which MI/M and MIG/I queuing results apply. This is because in FCFS-PS packets and not messages are served on a FCFS basis. Therefore, in a multi-hop network messages naturally interrupt each other as packets belonging to different messages arrive on different input streams at overlapping time intervals.

B. Shortest Message Preempt Packet Scheduling (SMP-PS)

In pure SMP, shorter messages interrupt longer messages during their transmission and the longer messages resume their transmission once the shorter message is transmitted. Unlike pure SMP, SMP-PS only allows interruptions at the end of packet transmissions. Therefore if a packet belonging to a short message arrives during the transmission of a packet belonging to a longer message, it will not be transmitted until after that packet is transmitted. It will, however, be transmitted ahead of the rest of the packets belonging to the longer message.

In order to implement the SMP-PS algorithm, the network protocol must know the length of the message to which each packet belongs. This can simply be done with the use of a length field in the packet header. This length field will contain the length of the original message to which the packet belongs. There are many ways in which to represent the message length.

The simplest approach, and the one which we use in our simulation, is to let the length field represent the number of packets contained in the message (up to a maximum number of packets). This information is usually readily available from the higher (e.g. transport) layer protocol. This approach is particularly effective in a network where all packets are of the same length (e.g., ATM).

The SMP-PS algorithm can be implemented with a priority queue where the priority of a packet is equal to the inverse of the length of the message to which it belongs. The server serves packets from their queue in accordance with their priority and newly arrived packets are inserted into the queue according to their priority.

Figure 2:
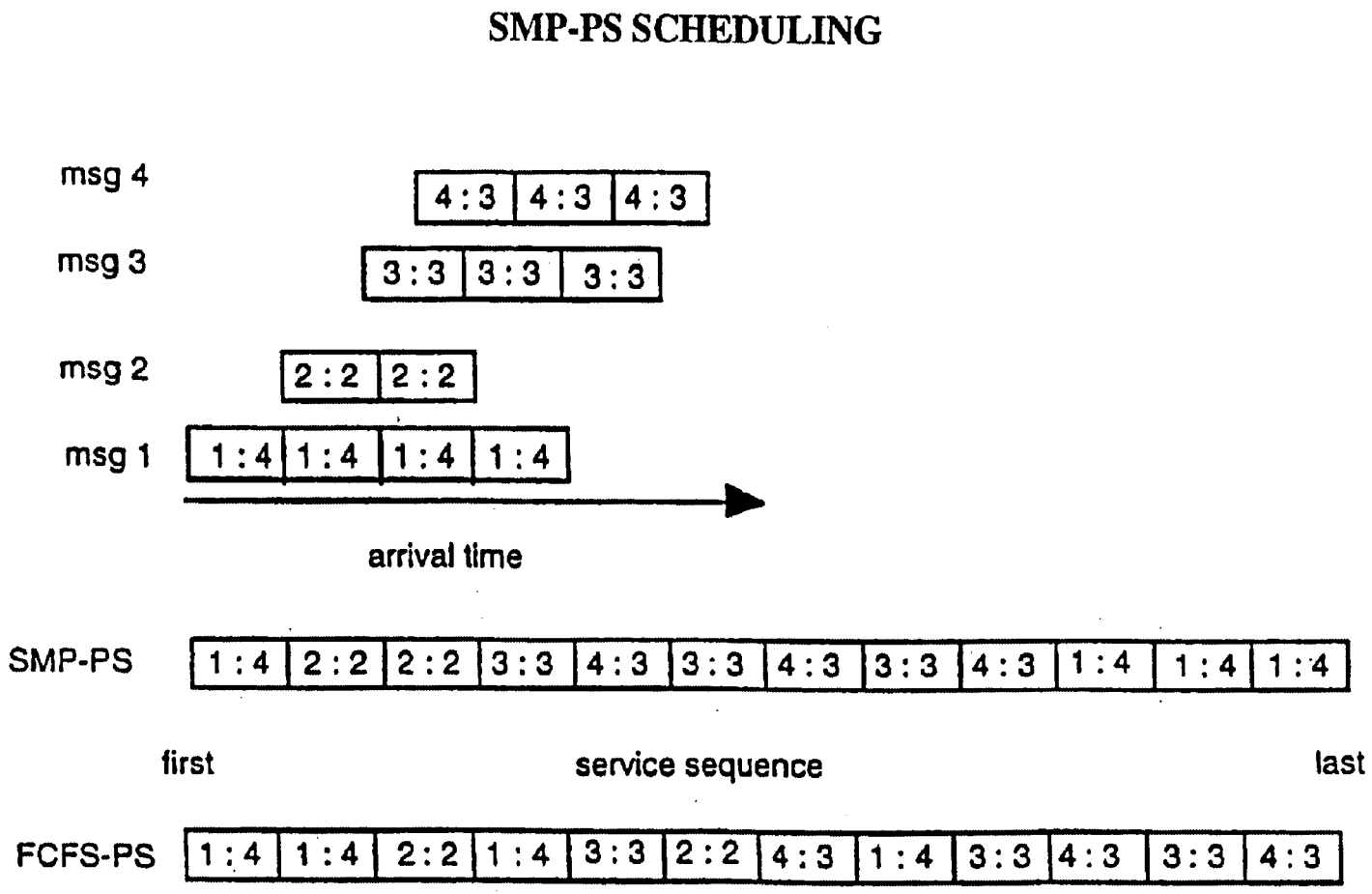
FIGS. 2 and 3 are charts of an example of AMP-PS and SRTT-PS scheduling.

For an example consider FIG. 2. On the top part of the figure the arrival of four messages is shown, according to the time in which the messages arrive. The first message to arrive (msg 1) contains 4 cells, the second message contains two cells, and the third and fourth messages each contains three cells. For the purpose of the example, in each cell we indicate the message number and the length of the message to which the cell belongs. On the bottom of the figure we show the order in which cells are served. The first cell served is the first cell of message 1. When message 2 arrives, since it is shorter than message 1, the two cells belonging to message two are served. Following those, the first cell of message 3, which is still shorter than message 1, is served. This cell is followed by the first cell of message 4. This is because messages 3 and 4 are of the same length and the first cell of message 4 arrives before the second cell of message 3. With similar reasoning the remaining cells of messages 3 and 4 are served in round-robin order. When messages 3 and 4 are done the last 3 cells of message 1 are served.

For the purpose of comparison, we also show in FIG. 2 the service sequence that would have resulted from FCFS-PS. As can be seen from the figure, with FCFS-PS scheduling, message 1 would have been served sooner, but messages 2, 3, and 4 would have all taken more time. In this example, the average message delay for SMP-PS is 6.75 cells and for the FCFS-PS it is 8 cells. Although this is only an example, it illustrates the benefit of SMP-PS scheduling.

This example also illustrates one of the shortcomings of SMP-PS scheduling. Consider for instance the scheduling of messages 3 and 4. In this case the two messages are of the same length and arrive at overlapping time intervals. Since the two are of the same length and have the same priority, they are served in a round-robin order. This round-robin effect causes both messages to be unnecessarily delayed. It is obvious that if we allowed message 3 to be served to completion first, the delay for serving message 3 would have been reduced without affecting the message 4 delay.

Another related shortcoming of the SMP-PS algorithm is that messages can be interrupted (by shorter ones) at any time during their transmission. So when a long message is being transmitted, and a shorter message arrives, the shorter message interrupts the longer one even if the longer message is almost completely transmitted. To illustrate -the absurdity of this phenomenon consider two message of 100 and 99 cells each. Suppose the 99 cell message arrives when the 100 cell message is on its previous to last cell. The 99 cell message would then interrupt the longer message and be transmitted completely, before the transmission of the last cell of the 100 cell message can resume. Clearly this is an undesirable phenomenon. It is known that in a single queue, the best strategy would give priority to the message with the shortest remaining service time. With that strategy, the last cell of the longer message would have been transmitted before the 99 cell message. Also with that a strategy the round-robin effect discussed in the previous paragraph would be eliminated. These ideas give rise to our next strategy which is based on the shortest remaining transmission time principle.

C. Shortest Remaining Transmission Time Packet Scheduling (SRTT-PS)

The obvious shortcoming of SMP-PS can be overcome by a simple variant of SMP-PS which gives priority to packets based on the remaining transmission time of the message to which they belong. In SRTT-PS scheduling, packets belonging to one message would have priority over those belonging to another message only if the remaining transmission time of the message to which they belong is shorter than the remaining transmission time of the other message. Again, as with SMP-PS, interruptions only occur at the end of packet transmissions. That is, no packet transmission is interrupted.

In order to implement a SRTT-PS algorithm, each node must have the complete message state information for every: message in its buffer. This is a much more complicated task than what was required to implement SMP-PS. To implement SRTT-PS, not only must we tag each packet with its message length, but we must also tag each packet with a message identifier that will allow all nodes in the network to track the state of each message. Since this message identifier is only used for the purpose of scheduling, it does not have to be truly unique. Therefore, a simple message identifier tag can be implemented using random numbers. The length of the tag must be sufficient so that the likelihood of having two different messages with the same tag at a given node is low. However, even if two messages have the same tag the algorithm will continue to work by reverting to SMP-PS scheduling for those two messages.

In addition, for the purpose of simplifying the implementation, each packet can also contain a sequence number which gives the order of that packet within the message. This sequence number is used to determine how much of the message has already been transmitted through the node. It is for use by the scheduling algorithm only and is not the same as the transport layer sequence number used for the reordering of the packet system.

The SRTT-PS algorithm can now be implemented at each of the nodes in the network. The implementation of the algorithm is independent from node to node. That is, scheduling at each node is based only on the remaining transmission time of messages at that node. The algorithm does not take into account the state of the messages in the entire network. Using the message identification number, the message length and the sequence number, the priority of packets belonging to a given message can be set as follows. At a given node's buffer, let Smin be the smallest sequence number of any of the remaining packets belonging to that message (i.e., all packets with smaller sequence numbers have already been transmitted) and let L be the message length. This tells us the Smin-I packets of that message have been transmitted and L—Smin still remain to be transmitted (assuming that sequence numbers start with 0). Then the remaining transmit time associated with all of the packets belonging to the message can now be set to L-Smin and the priority of these packets will equal the inverse of the remaining transmit time. Note, again, that this calculation is based on the state of the message at a given node and not at the entire network.

Figure 3:
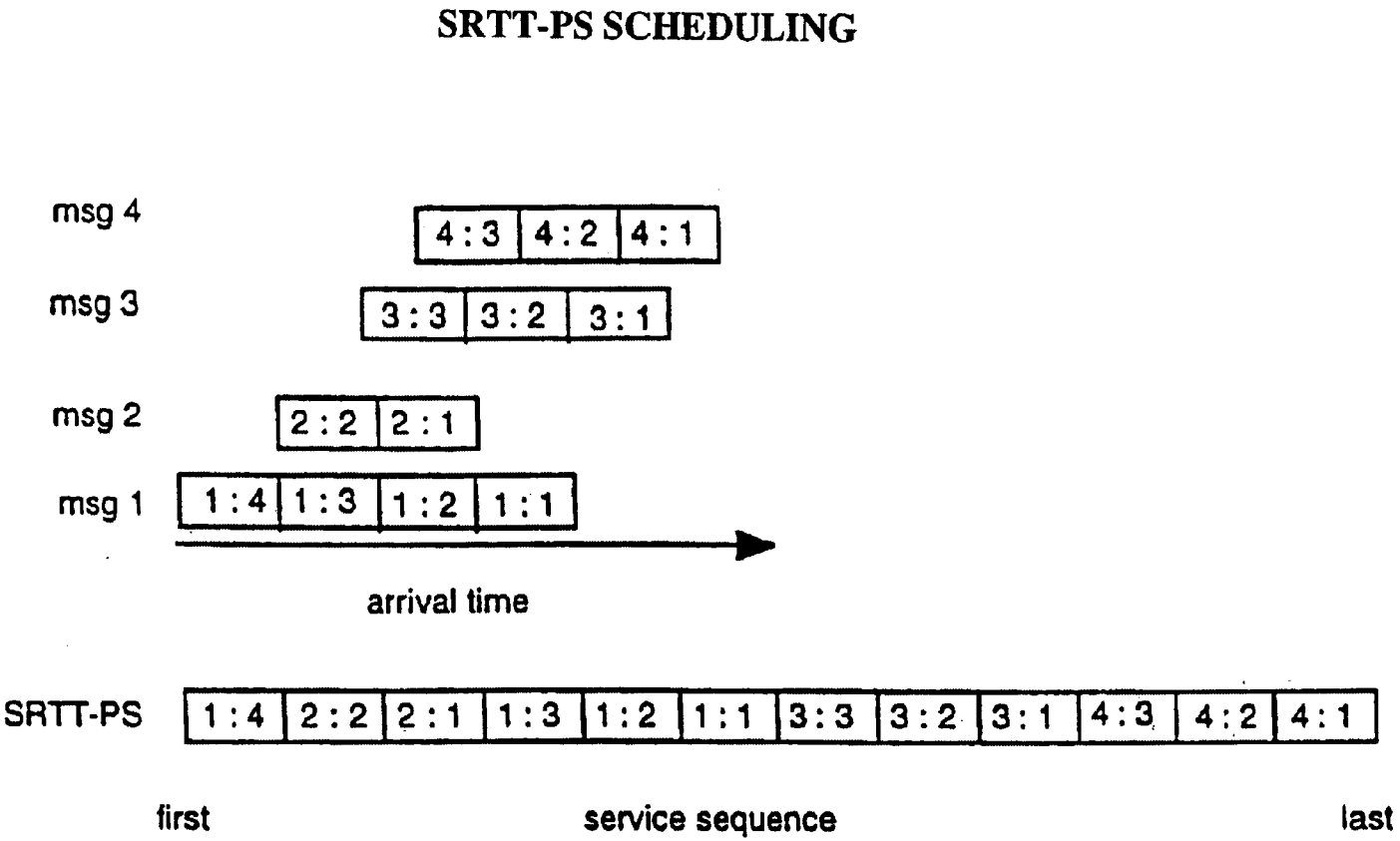

For example consider FIG. 3. Shown in the figure is the same message arrival sequence as that used in FIG. 2. The sequence in which cells are served is indicated at the bottom of the figure. In each cell, within the service sequence, we indicate the message number followed by the remaining message transmit time. Notice that message 1, which arrived first, receives services first. Message 2, which is of length 2 cells is served next. After that, service resumes for message 1, which has a remaining service time of 3. This remaining service time is the same for messages 3 and 4, but since the message 1 cells arrived first they are served first. After message 1 is served, message 3 is served. Notice again that message 3 is served to completion before we begin serving message 4. This is because as message 3 receives service the remaining transmit time is less than that of message 4 and therefore message 3 is not interrupted.

We see in this example how both the round-robin phenomenon and the interruption of nearly transmitted long messages exhibited by the SMP-PS algorithm is avoided with the use of the SRTT-PS algorithm. In this example, the average message transmit time is approximately 6.25 cells, a slight improvement over the SMP-PS algorithm.

The example of FIGS. 2 and 3 are useful for the purpose of illustrating the algorithms and their relative advantages. In order to gain more insight into the performance of these algorithms we have to resort to simulations. In the next section we start with a discussion of simulation results for a single node network and then show simulation results for a network with a more complicated topology.

III. Performance analysis

We analyze the performance of these scheduling algorithms through the use of simulation. All of the simulations presented in this paper were developed using the Opnet simulation tool. We start with a discussion of a single node system and then we describe the simulation for an example multi-hop network.

A. Single node system simulation

Figure 4:
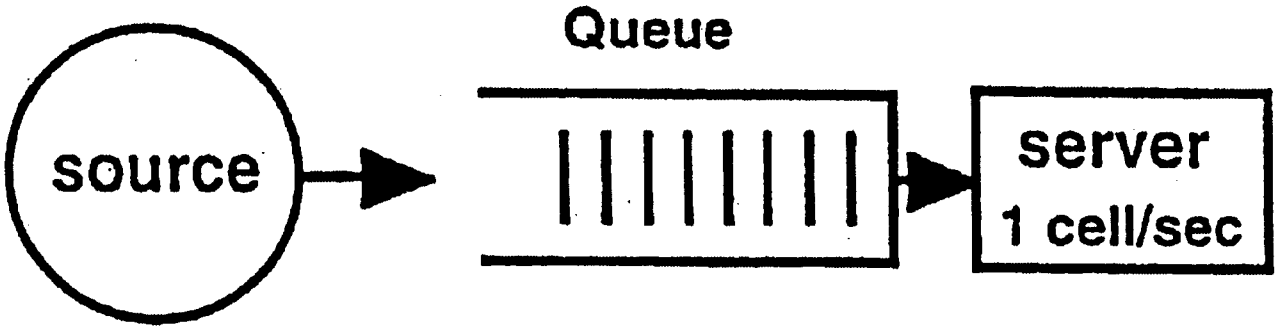
FIG. 4 is an illustration of a single node system.

The algorithm developed in the previous section, although designed for a multi-hop network, are also applicable to a single node system. In [8] order to gain some intuitive understanding of these algorithms, we start with the simulation of a single node system. In all of our simulations we assume for simplicity that the network uses fixed size packets (or cells). In a more comprehensive discussion of message scheduling for a single node satellite broadcast system is presented. Here we simply present the simulation results for the system of FIG. 4, where a single source, generating messages of various lengths with exponential inter-arrival times, feeds a server with a buffer. The server, for the purpose of this example, has a service rate of one cell per second.

We start with a simple source which randomly generates messages of two sizes. Half of the messages are short messages which are only one cell in length and the other half are long messages which are 100 cells in length. Note that in this case, there is essentially no difference between the SRTT and the SMP scheduling algorithms because messages arrive at a node all at once and hence the round-robin effect is eliminated. Therefore, here we only show the results for the SRTT case. This simple case of two message sizes may not be realistic, but is useful for the purpose of illustrating the behavior of these algorithms. Also, it is somewhat representative of recent trends in network traffic that is due to the use of client server applications where short requests are answered with long transmissions (e.g. download of a long file).

Figure 5:
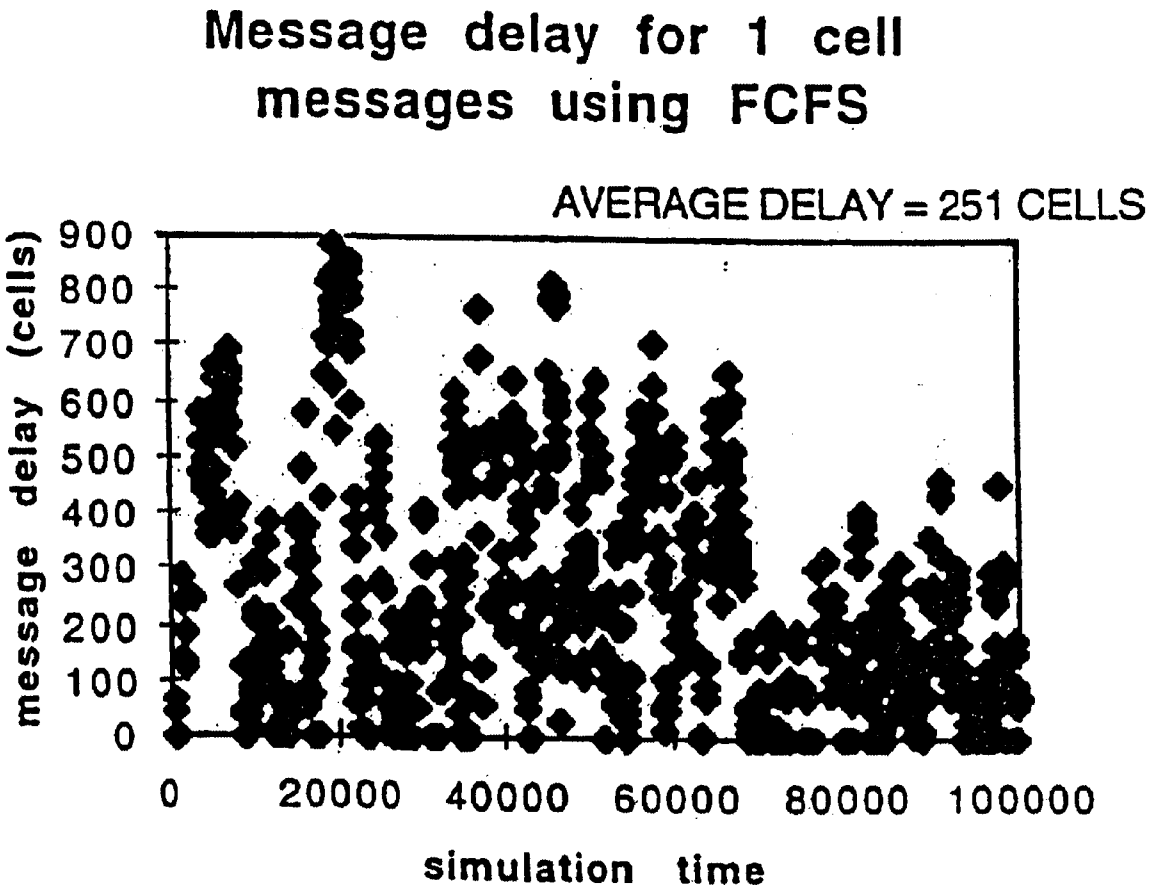
FIG. 5 is a chart of short message delay in a FCFS-PS system.
Figure 6:
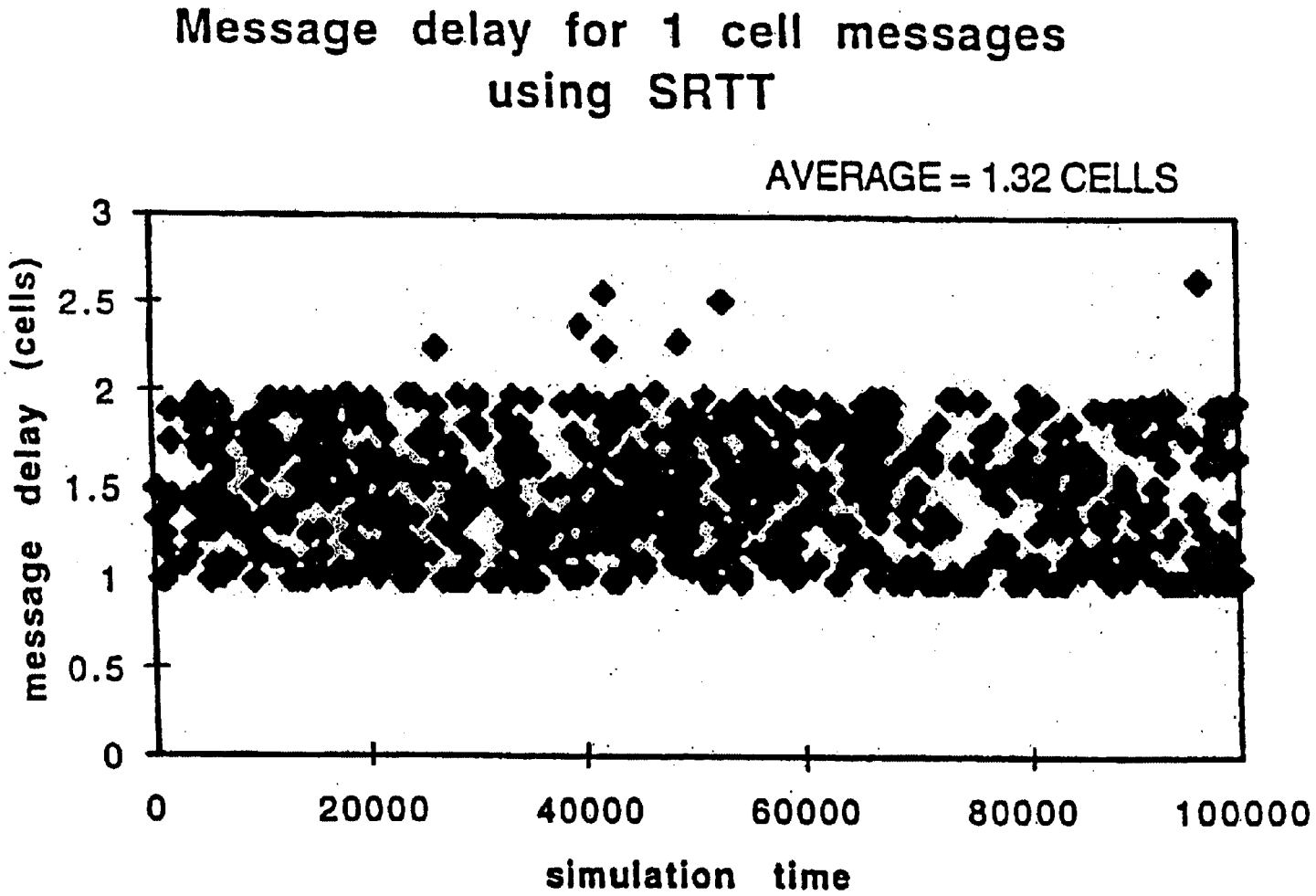
FIG. 6 is a chart of short message delay in a SRTT-PS system.

Our source generates messages with exponential inter-arrival times. For the simulation results shown in FIGS. 5–8 we use a message arrival rate of 0.0167 messages per second (inter-arrival time of 60 seconds), which is equivalent to an 85% load on the server. All of the figures show a total system delay (queuing plus transmission) for complete messages over the entire simulation time of 100,000 seconds. FIG. 5, shows the simulated message delay for the short messages when using FCFS. This is, perhaps the most important figure in the sequence. What we see is the effect of having short messages queued behind long messages. The average delay for a short (1 cell) message in the FCFS-PS system is 251 cells. In contrast FIG. 6 shows the equivalent delay when SRTT-PS is used. Since, with SRTT packets belonging to short messages get priority over long messages, we see in FIG. 6 that short messages experience minimal delay. The average short message delay for SRTT-PS is 1.31 cells (or seconds).

Figure 7:
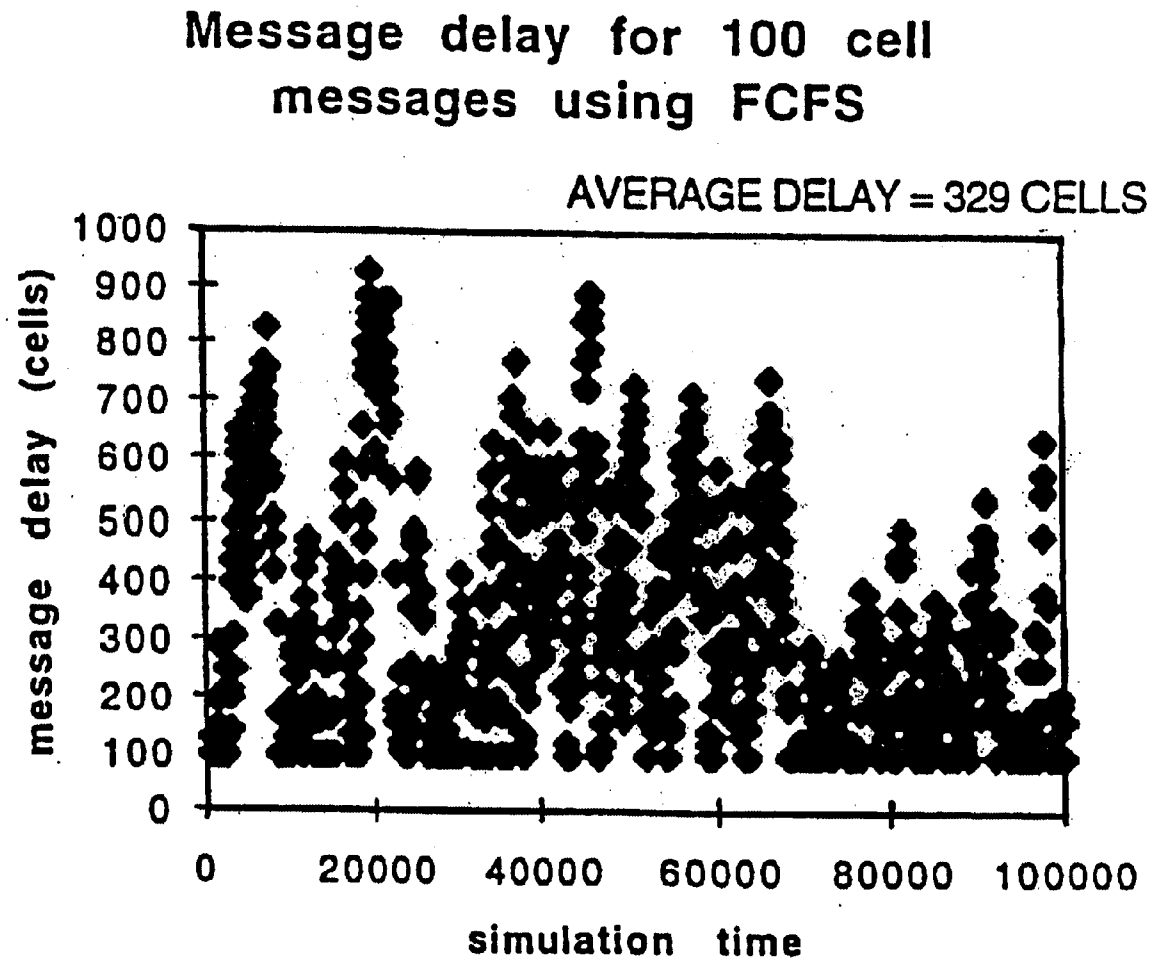
FIG. 7 is a chart of long message delay in a FCFS-PS system.
Figure 8:
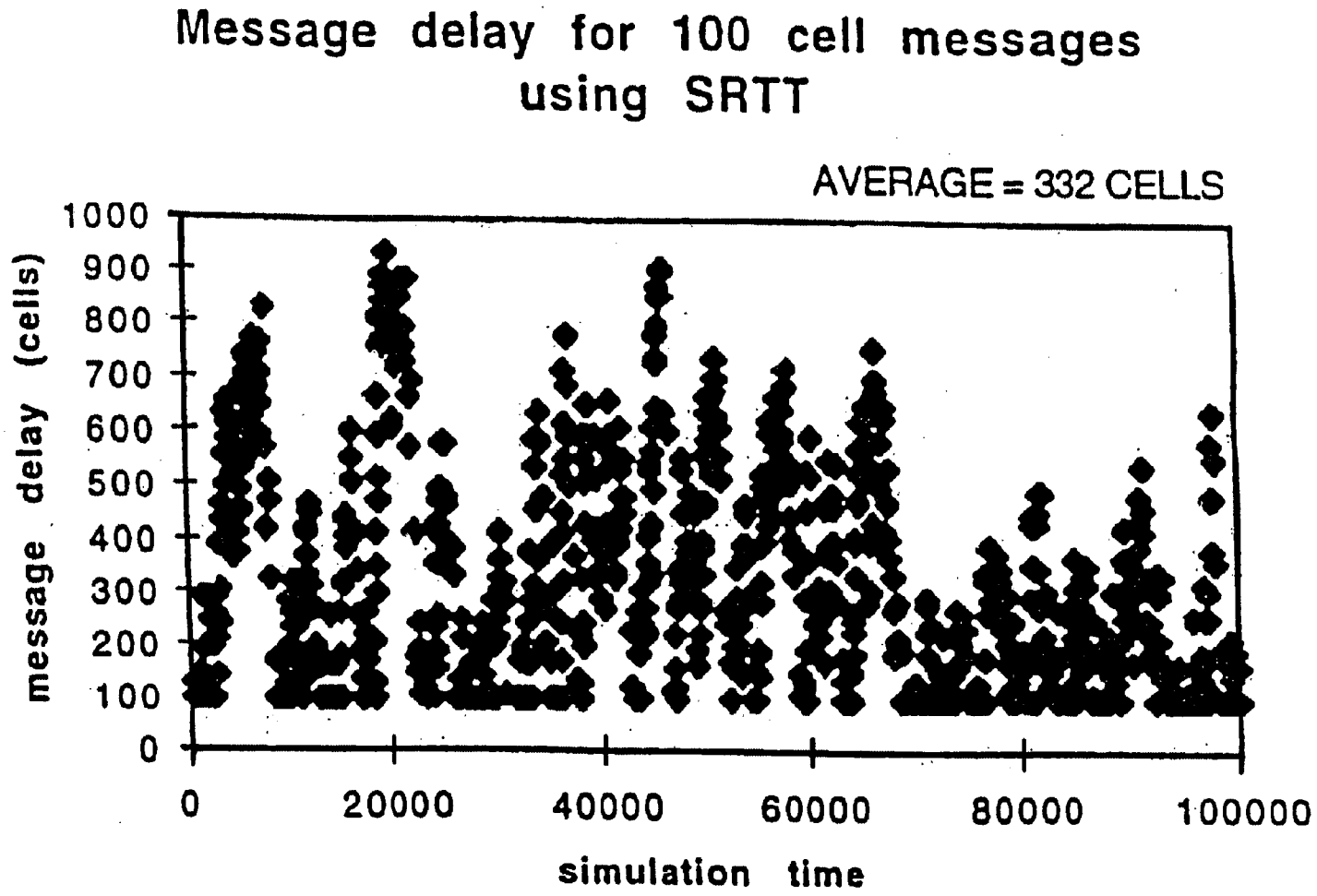
FIG. 8 is a chart of long message delay in a SRTT-PS system.

Despite this significant improvement in the delay for the short messages when using SRTT-PS, in FIGS. 7 and 8 we see that the long message delay is almost the same for both systems. This is due to the fact that even though short messages preempt the long ones, the overall load on the system that is due to short messages is relatively low and has minimal impact on long message delays.

Figure 9:
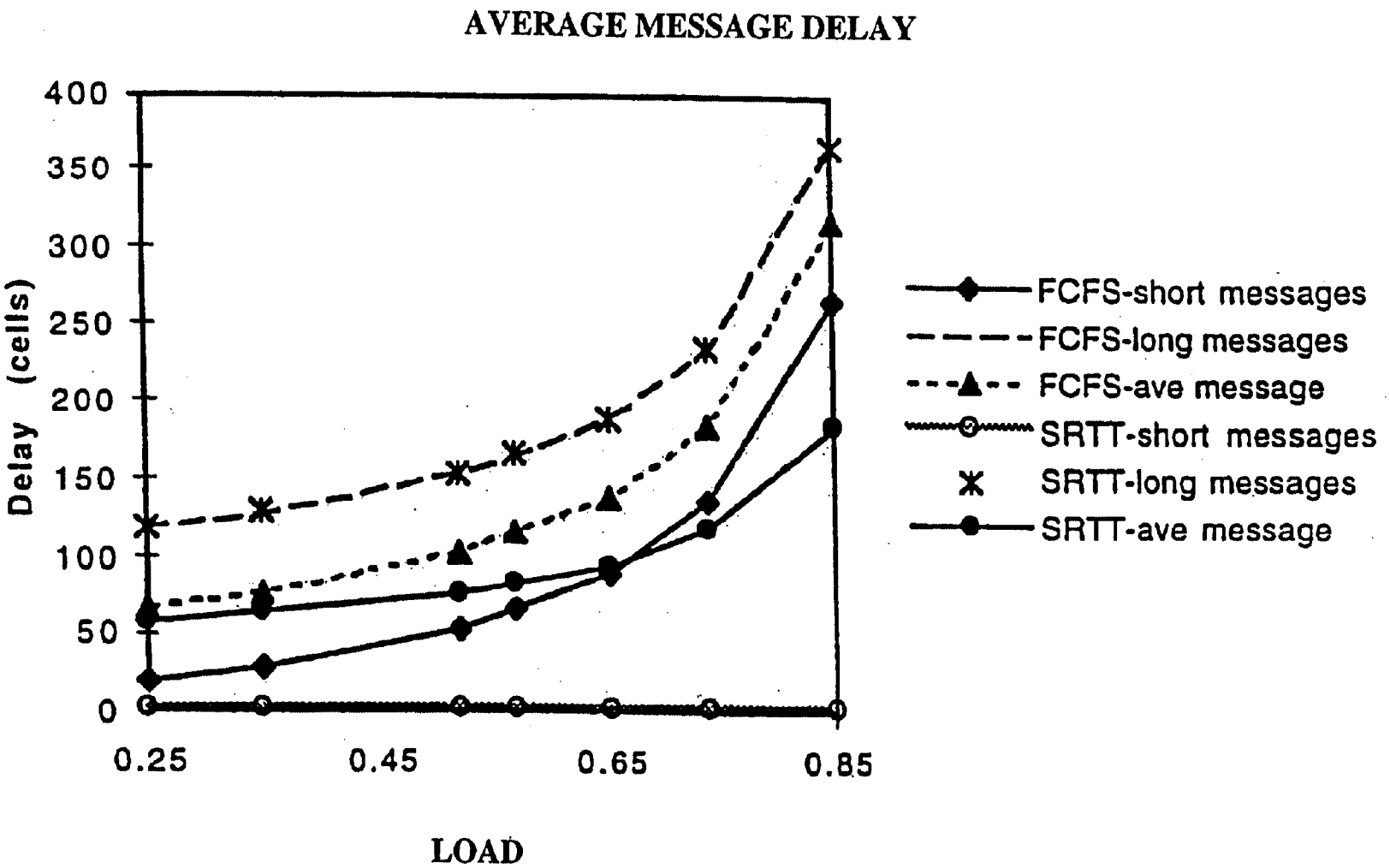
FIG. 9 is a chart of average message delay vs. load.

The results from FIGS. 5–8 were conducted for a system with a load of 85%. In FIG. 9 we show the average message delay vs. the load, for a wide range of load values, for both the short and the long messages. As can be seen from the figure, the average delay for the long messages is almost the same under the SRTT and FCFS service disciplines. However, the short message delay is a much smaller under the SRTT scheduling. This results in an overall reduction in average message delay of nearly a factor of two. Clearly these results are very encouraging for the SRTT-PS algorithm. However, it is clear that the use of just two message sizes in the simulations may not be sufficient to properly evaluate the performance of the algorithms.

Figure 10:
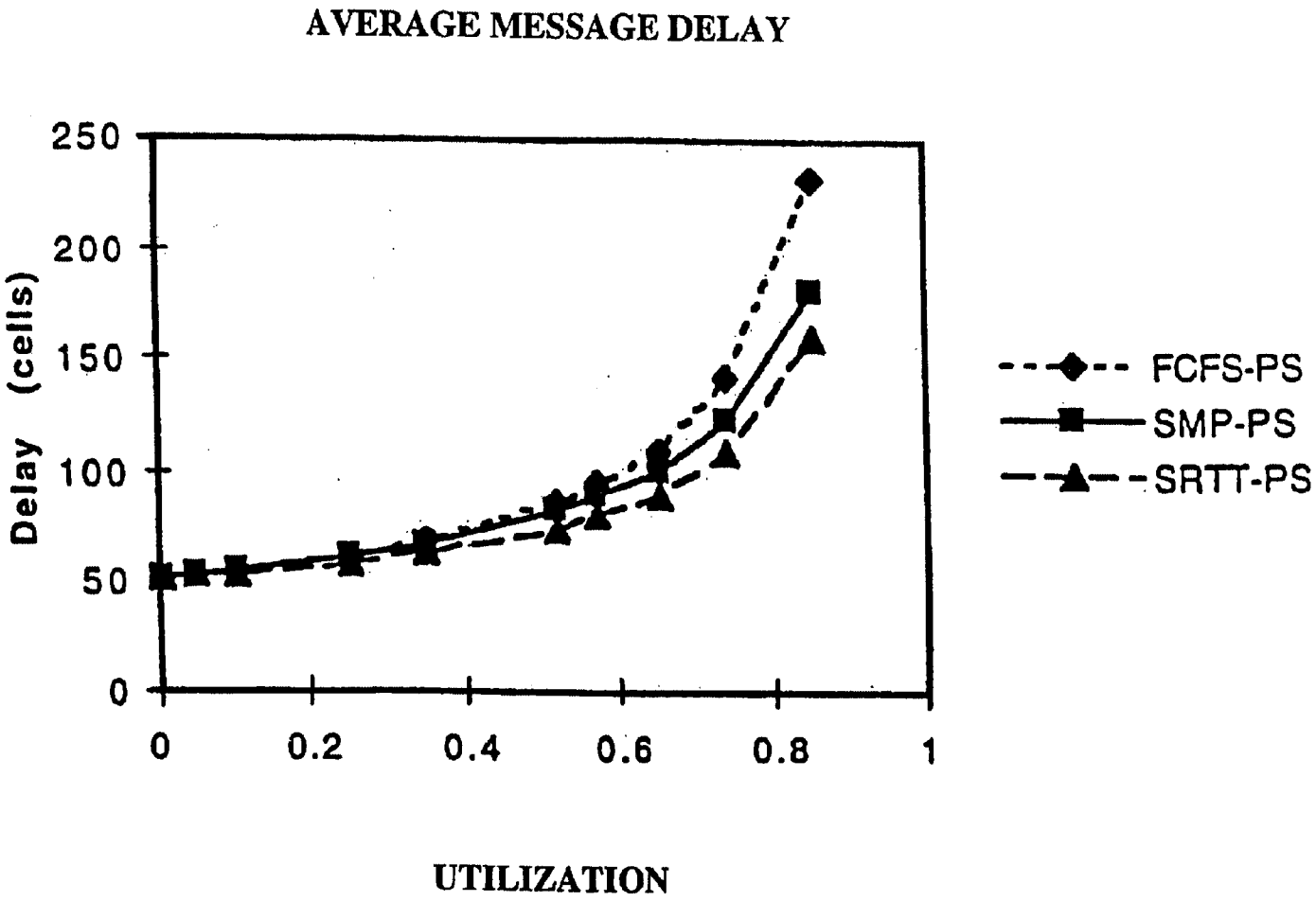
FIG. 10 charts average message delay vs. load for a single node system.
Figure 11:
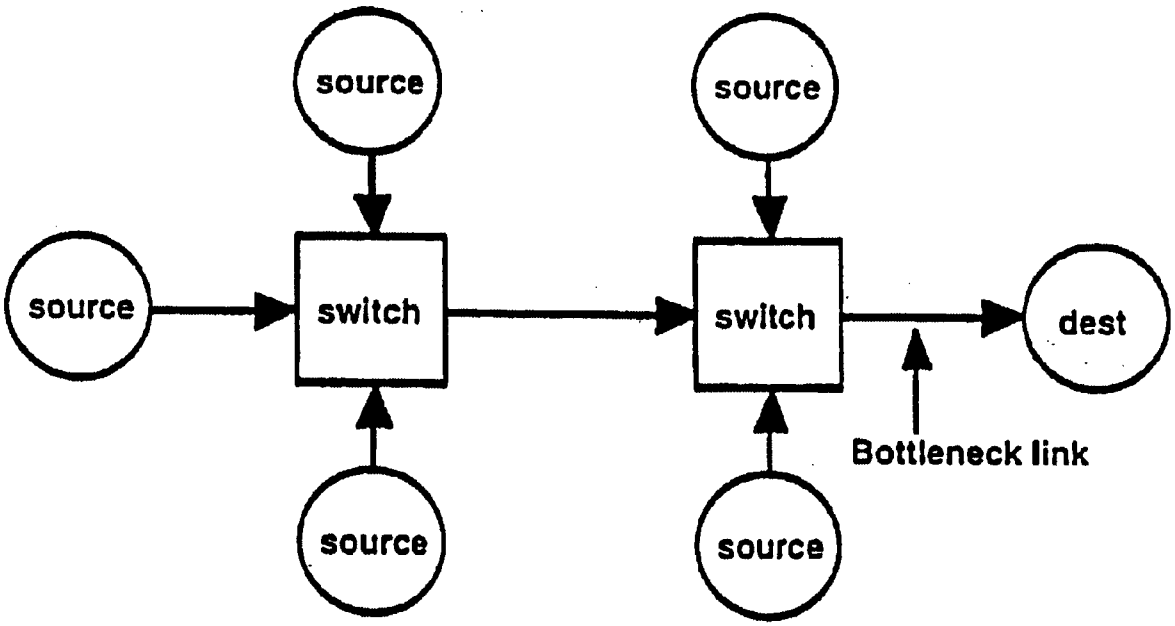
FIG. 11 is an illustration of a network using the present invention.

In order to obtain additional insight to the performance of the algorithm, we simulated the single server system with a wider range of message sizes. The simulation results shown in FIGS. 10 and 11 are for a system with messages sizes uniformly distributed between 1 and 100. That is, each arriving message is of size between 1 and 100 cells with equal probability for each size. In FIG. 10 we show the average delay vs. the load for all three service disciplines. As expected, the SRTT-PS algorithm results in the smallest delays, followed by the SMP-PS and the FCFS-PS algorithm. What we see from FIG. 10 is that the difference in the delay values is not as significant as in the two message size simulations.. This implies that the benefits of SRTT and SMP are most noticeable in a system with a wide variation in message sizes.

B. Multi-Hop network simulation

While the single node network simulation shows many of the benefits of message based scheduling, it fails to capture some of the effects that occur in a multi-hop network. For example, in a single node network messages are typically assumed to arrive one at a time. However, in a multi-hop network messages arrive as packets; and different messages, traveling along different routes, can arrive at an intermediate node in overlapping time intervals. Consequently, the affects of a scheduling algorithm in a multi-hop network may not be the same as in a single node system.

In the simulations we use the network of FIG. 11. In this network we have 5 source nodes, all sending messages to the same destination. Each of the source nodes generates one fifth of the total traffic in the network. All of the links in the network have the same capacity, of one cell per second. As a result the bottleneck in the system is the link just before the destination node. Clearly, most of the queuing delays in this network will occur at the bottleneck link. We chose this example network in order to examine the performance of the scheduling algorithm, at an intermediate network node, where all of the traffic is "in-route" traffic. This gives us the opportunity to examine the performance of the algorithm where messages are arriving at a node fragmented into packets, at overlapping time intervals, rather than complete messages arriving one at a time.

Figure 12:
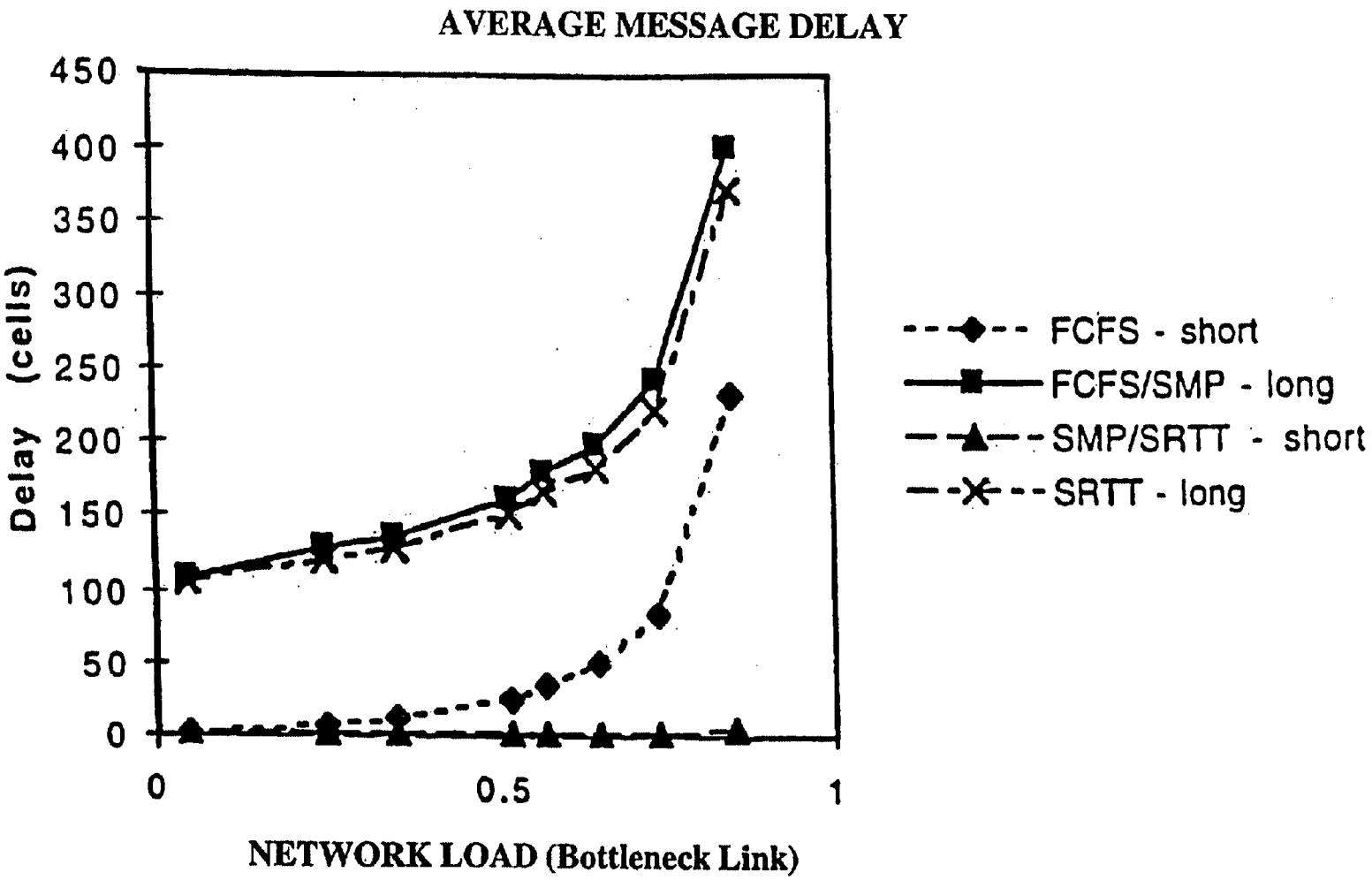
FIG. 12 is a chart of average delay for a system with two message sizes.
Figure 13:
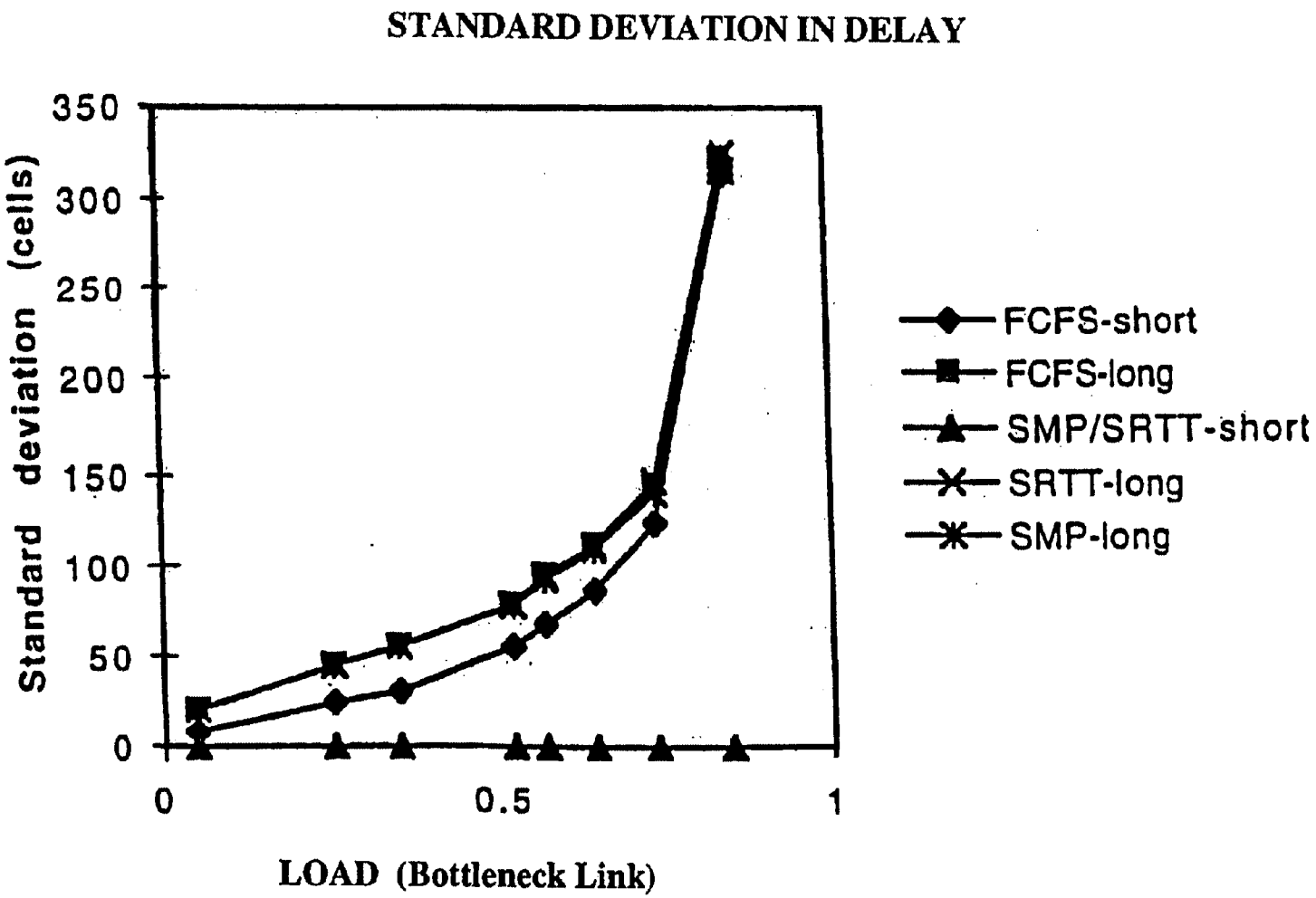
FIG. 13 is a chart of standard deviation for the delay of a system with two message sizes.

As we did with the single node system, our first simulation is for a very simple message length distribution, where each source generates messages of two sizes; short messages which are one cell each and long messages which are 100 cells each. In FIG. 12 we show the average message delay vs. the network load at the bottleneck link for all three scheduling algorithms for both the long (100 cells) and the short (1 cell) messages. As expected, the average short message delay for both SMP and SRTT were essentially the same and substantially smaller than for the FCFS algorithm. For the long message delay, the SMP and FCFS algorithms performed nearly the same. The surprising was that the SRTT resulted in the smallest average long message delay. This is despite the fact that SRTT gives preemptive priority to the shorter messages. This rather surprising result can be attributed to the fact that the SRTT algorithm eliminates that round-robin phenomenon that occurs in FCFS an SMP. While with FCFS and SMP messages that arrive in overlapping time periods are served in a round robin order, based on the arrival times of the cells belonging to those messages, in SRTT this round-robin effect is eliminated. Consequently, SRTT results in reduced message delays for both the short and the long messages under all three schemes. As shown in the figure, for short messages the delay variation is almost entirely eliminated with the SMP and SRTT schemes. While for long messages FCFS and SMP resulted in almost identical standard deviations and SRTT slightly reduced delay variations. This result is significant because it tells us that for short messages SMP and SRTT not only reduce queuing delay but almost entirely eliminate any variations in delay.

Figure 14:
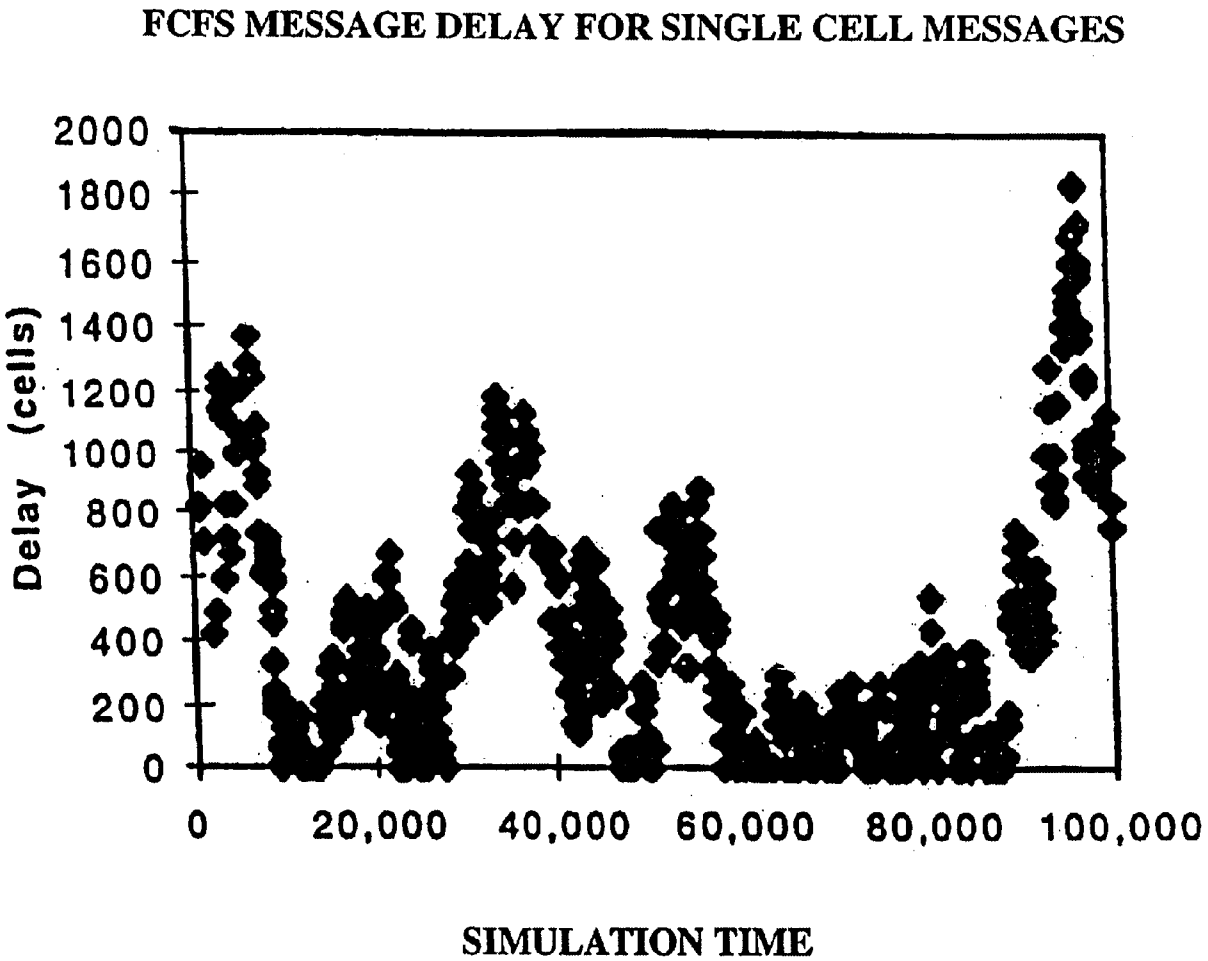
FIGS. 14 and 15 are charts of one cell message delay for the network of FIG. 12.
Figure 15:
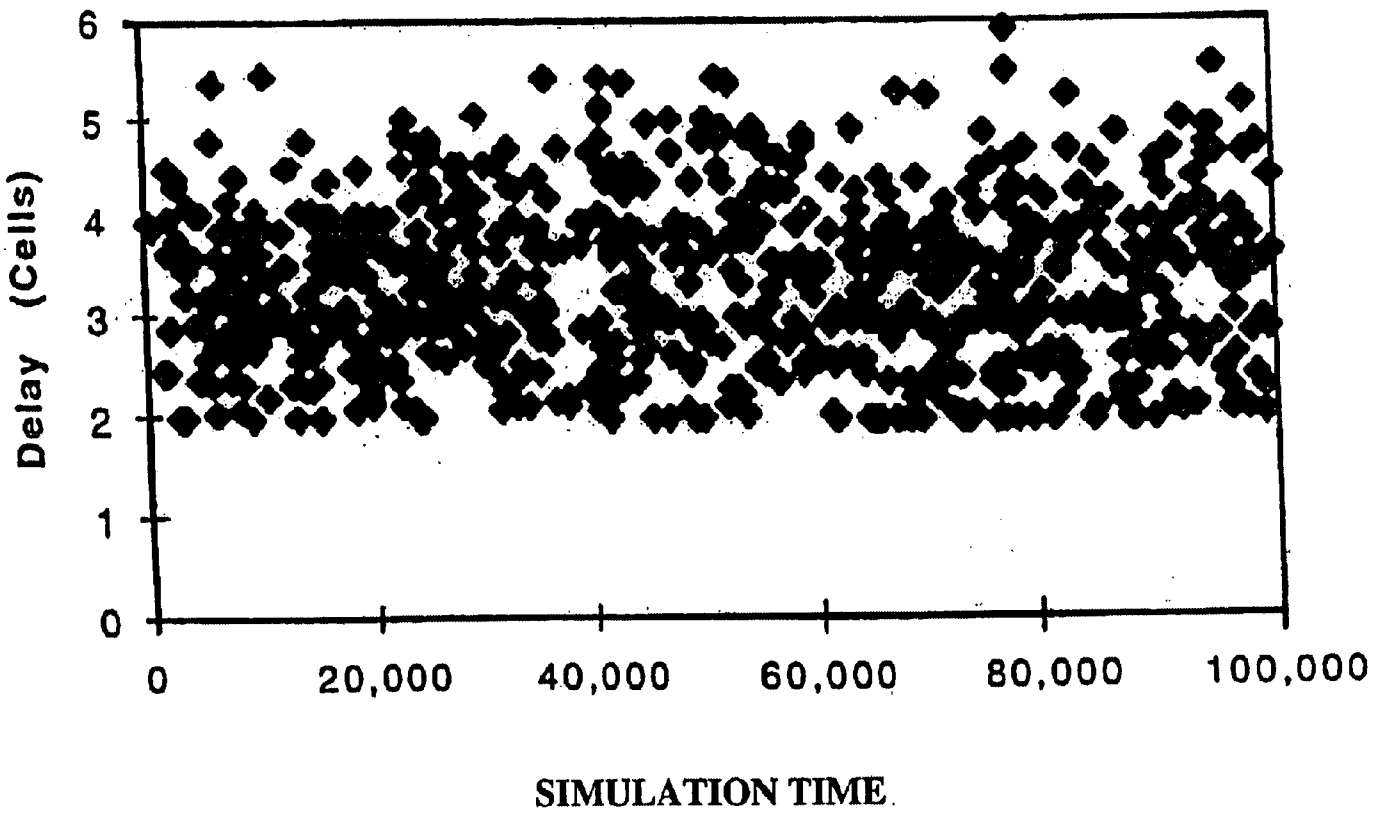

In FIGS. 14–15, we plot a simulation trace of the end-to-end delay for the short messages in the FCFS and SRTT algorithms. These plots show a short time interval during the simulation of a system with an 85% load on the bottleneck link. Since the delays for SMP were very similar to SRTT and are omitted here for brevity. Similarly, the plots of long message delays for all three algorithms were very similar and are omitted for brevity. In FIG. 14 we see the message delay for short messages in the FCFS system. As can be seen from the figure, short messages are often delayed for 100's of cells, while they are "stuck" behind long messages in the buffer. In contrast, in FIG. 15 we show the short message delay for the SRTT system. Here we see that short messages take somewhere between 2 and 6 cells (seconds) to get through the network. This makes sense because the shortest route between a source and the destination is two hops.

Figure 16:
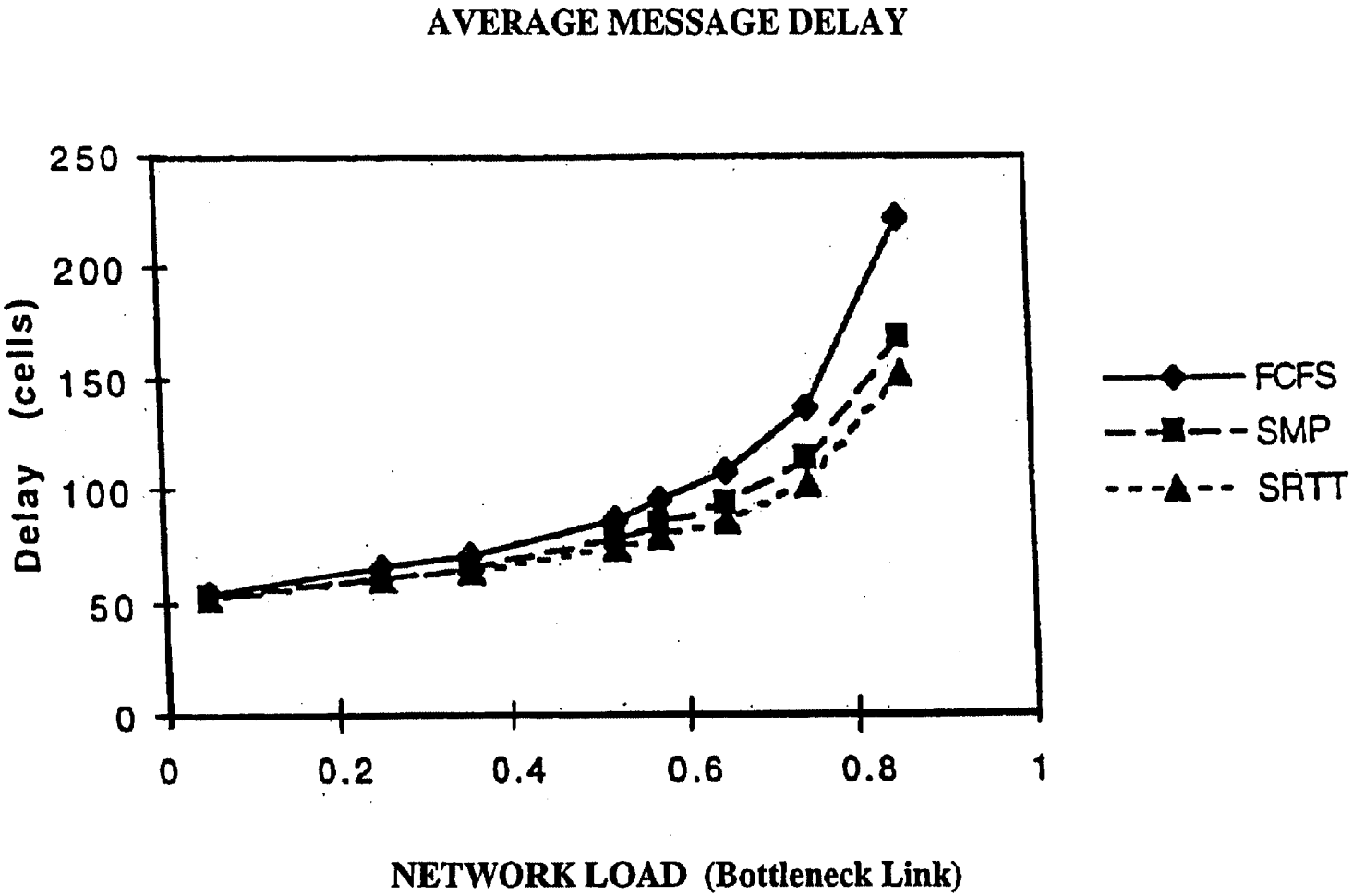
FIG. 16 is a chart of message delay for the network of FIG. 12 with uniformly distributed message lengths.
Figure 17:
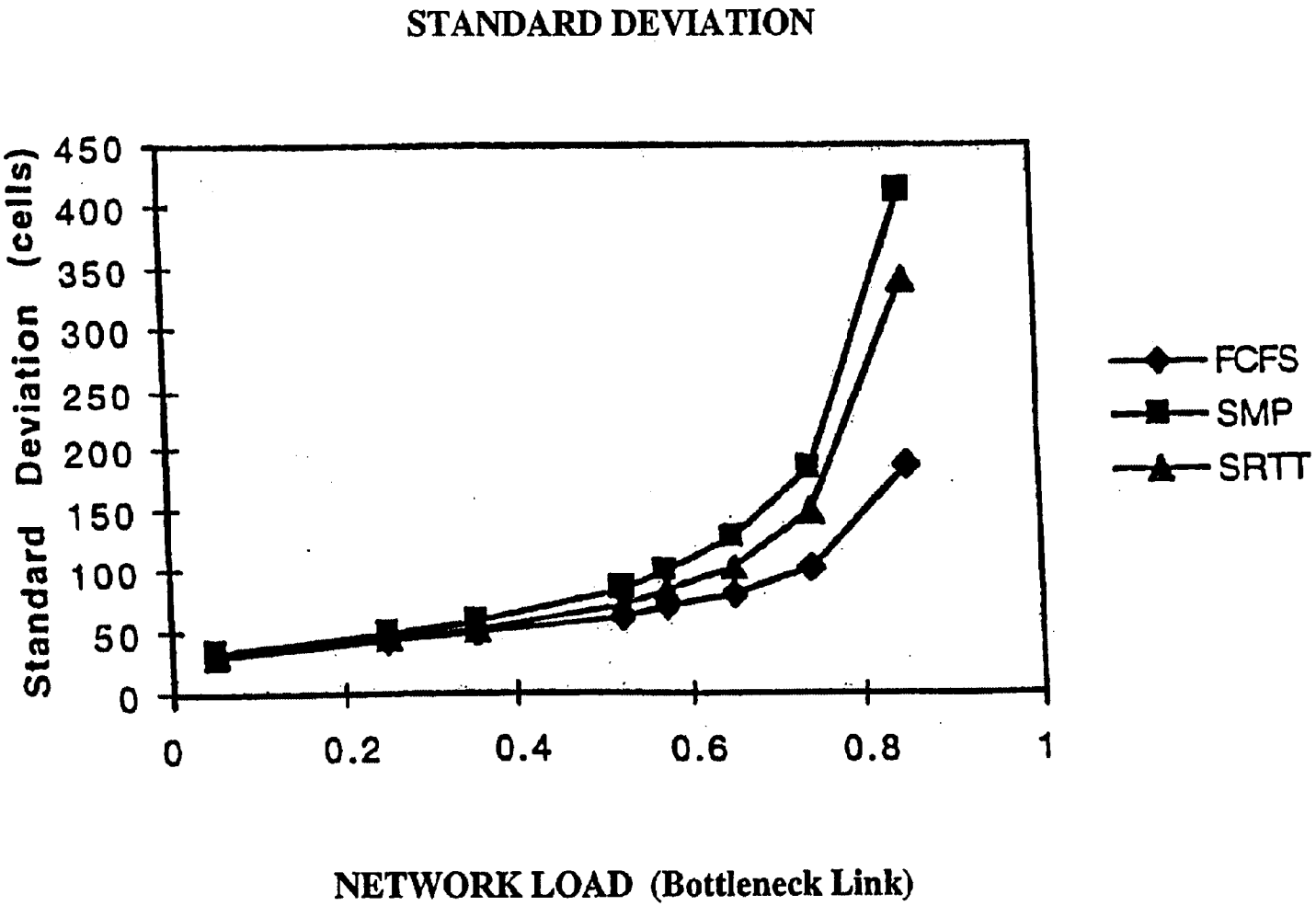
FIG. 17 is the standard deviation of the delays of FIG. 16.

Finally, in FIGS. 16 and 17, we plot results for a uniform message length distribution, where messages are uniformly distributed between 1 and 100 cells. Here again, we see that the average message delay is minimized by the SRTT algorithm and the FCFS results in the largest average delays. However, we also see from FIG. 17 that the standard deviation in delay (over all messages) is largest with SMP and smallest with FCFS. Overall, the results that were obtained for the multi-hop network are very similar to those obtained for a single node system. These results are encouraging because they tell us that a simple implementation of the SRTT or SMP algorithm can reduce end-to-end message delays significantly.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for scheduling network layer packets based upon application message length, said process comprising the steps of: identifying message lengths for all messages awaiting scheduling of the transmission into a network to identify shortest messages; and a first prioritizing step performed by prioritizing messages for transmission by sending shortest messages first.

2. A process, as defined in claim 1, wherein the identifying step is performed by noting each length field in each message packet header.

3. A process as defined in claim 2, wherein said first prioritizing step is performed by establishing a priority for a message packet equaling an inverse length of the length field in each message packet header.

4. A process, as defined in claim 3, in which the first prioritizing step further comprises using a server which serves message packets in accordance with their priority and in which new message packets are inserted into the priority queue according to their priority.

5. A process as defined in claim 1, further comprises a second prioritizing step of prioritizing messages in accordance with the remaining transmission time.

6. A process as defined in claim 5, wherein said second prioritizing step comprises giving all messages preemptive priority if they possess a shortest remaining transmission time.

7. A process, as defined in claim 4, further comprises a second prioritizing step of prioritizing messages in accordance with a remaining transmission time.

8. A process as defined in claim 7, wherein said second prioritizing step comprises giving all messages preemptive priority if they possess a shortest remaining transmission time.

9. A system for scheduling network layer packets based upon application message length, said process comprising: a means for identifying message lengths for all messages awaiting scheduling of transmission into a network to identify shortest messages; and a first prioritizing means for prioritizing messages for transmission by sending shortest messages first.

10. A system, as defined in claim 9, wherein the identifying means is performed by a network noting each length field in each message packet header.

11. A system as defined in claim 10, wherein said first prioritizing means is performed by a server establishing a priority queue for all messages with a priority for a message packet equaling an inverse length of the length field in each message packet header.

12. A system, as defined in claim 11, in which the first prioritizing means further comprises using a server which serves message packets in accordance with their priority and in which new message packets are inserted into the priority queue according to their priority.

* * * * *